United States Patent [19]

Wheeler et al.

[11] 4,279,322
[45] Jul. 21, 1981

[54] AIR CUSHION VEHICLE FLEXIBLE SKIRT ASSEMBLIES

[75] Inventors: Raymond L. Wheeler, East Cowes; John Henry, Cowes; John E. Dadswell, Newport, all of England

[73] Assignee: British Hovercraft Corporation Limited, Yeovil, England

[21] Appl. No.: 32,217

[22] Filed: Apr. 23, 1979

[30] Foreign Application Priority Data

| Apr. 28, 1978 [GB] | United Kingdom | 16151/78 |
| Mar. 22, 1979 [GB] | United Kingdom | 10198/79 |
| Apr. 20, 1979 [GB] | United Kingdom | 13801/79 |

[51] Int. Cl.³ .............................................. B60V 1/16
[52] U.S. Cl. ..................................... 180/128; 428/31; 428/64; 428/65; 428/66; 428/131; 428/137; 428/138; 428/250; 428/252; 428/376; 428/377
[58] Field of Search ......................... 428/31, 32, 35, 64, 428/65, 66, 74, 81, 131, 137, 138, 195, 196, 246, 250, 252, 373, 375, 376, 377; 180/127, 128

[56] References Cited

U.S. PATENT DOCUMENTS

| 3,244,248 | 4/1966 | Prickett | 180/127 |
| 3,252,536 | 5/1966 | Jones | 180/128 |
| 3,254,731 | 6/1966 | Schruber | 180/127 |
| 3,301,342 | 1/1967 | Jones et al. | 180/128 |
| 3,901,988 | 8/1975 | Coles et al. | 428/231 |
| 4,056,645 | 11/1977 | Henry | 180/128 |
| 4,107,369 | 8/1978 | Gardner | 428/252 |
| 4,115,609 | 9/1978 | Denman | 428/246 |
| 4,131,175 | 12/1978 | Wheeler | 180/127 |
| 4,176,729 | 12/1979 | Down | 180/127 |

*Primary Examiner*—James J. Bell
*Attorney, Agent, or Firm*—Larson and Taylor

[57] ABSTRACT

A device for arresting the growth of a rip in reinforced flexible sheet material, for example elastomeric sheet material reinforced with woven nylon fabric, comprises a flexible sheath member having a flexible core member extending throughout its length and chemically bonded thereto. The sheath member includes tensile load path discontinuities at intervals along the length of the core member and at least in regions of the sheath member remote from the core member. The tensile load path discontinuities prevent tensile loads being transmitted along the length of those regions of the sheath member which are not bonded to the core member, such loads being diffused into the core member because of the bond between the sheath member and the core member. A number of these devices may be attached to an air cushion vehicle flexible skirt assembly manufactured from sheet rubber reinforced with woven nylon fabric so as to arrest the growth of rips which may propagate during operation of the vehicle.

18 Claims, 9 Drawing Figures

AIR CUSHION VEHICLE FLEXIBLE SKIRT ASSEMBLIES

This invention relates to air cushion vehicle (A.C.V.) flexible skirt assemblies, and is more particularly concerned with devices for arresting the growth of rips or tears in reinforced flexible sheet material from which such a skirt assembly is manufactured.

The component sections making up an A.C.V. flexible skirt are generally manufactured from sheet rubber that is reinforced with woven nylon fabric, the rubber providing the required flexibility and the nylon fabric providing the necessary strength. These components are then fastened together, generally by bonded and/or bolted lap joints, and often have holes cut in them to allow pressurised air to pass from one section of the skirt to another, or to permit air to flow from the skirt to the cushion. As in metal structures a hole constitutes a stress concentration and under the fluctuating loads to which the skirt is subjected during vehicle operation, the threads of the nylon fabric at the edge of a hole may fail in fatigue. After failure of one of the threads at the edge of a hole its load has to be carried by the next adjacent thread which soon fails. As threads progressively fail a rip develops which becomes self-propagating under the energy that is present in the skirt. When this happens a complete section of the skirt may be torn away in a matter of minutes, and with a large section of the skirt missing the loss of cushion air may be such as to render the vehicle unoperational on its cushion.

One flexible skirt that has been developed and extensively used on operational A.C.V.'s is of two stage configuration, the upper stage of the skirt being formed by an inflatable bag member that is stiffened by being inflated, and the lower stage being formed by a plurality of adjacent and independent flexible skirt elements known in the art as "fingers." The bag member is manufactured from sheet rubber reinforced with nylon fabric and has two opposed edges fixed to the vehicle hard structure along fixing lines that are spaced apart so that the bag member extends between them to enclose the outlet end of a peripherally extending duct leading from a plenum chamber formed by the vehicle hard structure. In operation, pressurised air is delivered to the plenum chamber by one or more lift fans, and flows through the peripherally extending duct to inflate the bag member. The section of the bag member that faces the cushion area beneath the vehicle is apertured to permit some of the air to escape in a controlled manner from the bag member into the cushion area to build up and sustain the cushion. The total cross-sectional area of the apertures in the bag member is a significant factor in establishing a desired pressure ratio between the air inflating the bag member and the air forming the cushion.

A worthwhile power saving can be made by having a low bag-to-cushion pressure ratio, and to achieve this it is necessary to have a large aperture area in the section of the bag member which faces the cushion. When this section of the bag is formed from sheet material reinforced with conventional woven nylon fabric then its structural integrity is greatly reduced by cutting a large number of holes in the material because of the large number of nylon threads which are cut. Thus the chances of a rip propagating are greatly enhanced.

To overcome this problem we proposed to use a mock leno fabric as the reinforcing fabric and to form the necessary apertures by exclusion of the rubber from some of the apertures preformed between the threads of the mock leno fabric. Thus the threads of the fabric would be unbroken at the apertures. However, it was necessary in practice to make the cushion facing section of the bag member from a mock leno fabric reinforced panel and a panel reinforced by conventional woven nylon fabric, these two panels being joined by a butt strap so that the joint extended longitudinally around the bag member. A major rip of a type not previously experienced occurred in a bag member of this construction, the root cause of this failure being a breakdown of the bond between the mock leno fabric and the rubber which resulted in the mock leno fabric pulling out of the rubber near to the panel edges at the butt strap. The cause of the breakdown of the bond between the mock leno fabric and the rubber is considered to be due to difficulties in applying a fully effective pretreatment to the bulky mock leno fabric.

It was suggested that a device known for use in arresting the growth of a crack in a metal structure might be used to arrest a rip propagating in an A.C.V. flexible skirt assembly. Such a device is known as a "Duplex device" and comprises a composite device in which the interfacial contact between an inner member (the "core" member) and an element around it (the "sheath" member) is such that the local shear strength of the interface is reduced as the local tensile stress in the core member increases. This is achieved by inducing controlled decoupling of the interface, the arrangement preferably being such that the local shear strength of the interface is reduced sufficiently to permit sliding at the interface when the local tensile stress in the core member approaches the ultimate tensile strength of the core member. It was appreciated that in order to meet the flexibility requirements when used with an A.C.V. skirt assembly the construction of the device would have to be modified whilst keeping the basic principles of the "Duplex device."

It was considered that a suitable device might be one in which the core member comprises nylon rope and the sheath member comprises sheet rubber reinforced with a woven nylon fabric. Such a device was manufactured in which two lengths of nylon rope were encased in spaced relationship to each other between sheets of reinforced rubber so as to achieve a frictional bond between the nylon ropes and the reinforced rubber. It was proposed to fix the device to the skirt by bolts passing through the sheath member at spaced intervals along the length of the device. In tests this device was found to be unsuitable because the nylon ropes pulled out of the sheath member at low loads and with little absorption of energy. It was also found that the rip in the skirt material tended to propagate into the device through the bolt holes and the device was torn away from the skirt material.

It is an object of the present invention to provide a device for arresting the growth of a rip in reinforced flexible sheet material, such a device being hereinafter referred to as a rip stop device.

It is another object of the invention to provide a rip stop device that will not be torn away from the sheet material to which it is attached when a rip propagates into it and is arrested.

Accordingly, in its broadest aspect the present invention provides a rip stop device comprising a flexible sheath member having a flexible core member extending throughout its length and chemically bonded thereto, said sheath member being formed from fabric reinforced elastomeric material and including tensile load path discontinuities in the sheath member at intervals along the length of the core member and at least at regions of the sheath member remote from the core member.

The tensile load path discontinuities in the sheath member ensure that tensile loads are not transmitted along the length of those regions of the sheath member which are not bonded to the core member but are transferred into the core member because of the chemical bond between the sheath member and the core member. The tensile load path discontinuities may extend across those parts of the sheath member which are bonded to the core member, and in this case they may be provided by discrete lengths of reinforcing fabric arranged in end to end relationship throughout the length of the sheath member. For ease of fabrication, however, the tensile load path discontinuities may be provided only in those regions of the sheath member remote from the core member, and in this case they may be provided by partially severing the reinforcing fabric prior to manufacture of the sheath member or by initially manufacturing the sheath member with continuous reinforcing fabric and then blanking out discontinuities in regions of the sheath member remote from the core member.

The fabric reinforcing the elastomeric material of the sheath member may comprise woven nylon cloth, and the elastomeric material may be synthetic rubber sheet, e.g. neoprene.

Preferably the flexible core member is of filamentary form, and may comprise either a rope, a cord, or a tape, each of which may be manufactured from nylon.

In one form of the invention, two or more flexible core members may extend throughout a flexible sheath member and are spaced from each other across the width of the sheath member.

Attachment of a rip stop device in accordance with the present invention to a fabric reinforced flexible sheet component is preferably by bolting, and bolt holes provided in the sheath member for facilitating such bolted attachment are positioned so as to be within the area of a length of reinforcing fabric between the tensile load path discontinuities and not at the discontinuity.

A fabric reinforced flexible sheet component to which a rip stop device in accordance with the broadest aspect of the invention is attached may comprise a component part of an A.C.V. flexible skirt assembly.

Accordingly, another aspect of the invention provides an A.C.V. flexible skirt assembly having attached thereto at least one rip stop device comprising a flexible sheath member having a flexible core member extending throughout its length and chemically bonded thereto, said sheath member being formed from elastomeric material reinforced with fabric providing tensile load path discontinuities in the sheath member at intervals along the length of the core member and at least at regions of the sheath member remote from the core member.

The flexible skirt component to which the rip stop device is attached may comprise a bag member that is formed by sheets of fabric reinforced elastomeric material joined in end to end relationship by bonded and/or bolted joints, and having their other two edges adapted for attachment to spaced fixing lines on rigid structure of the A.C.V. Rip stop devices in accordance with the present invention may be bolted to the bag member at the positions of the joints between the sheets, and they may also be bolted to the bag member at selected positions intermediate these joints.

The ends of the core member may extend beyond the ends of the sheath member, and may be attached back to suitable fixing points on the rigid structure of the A.C.V.

One particular form of flexible skirt embodying rip stop devices in accordance with the present invention includes an inflatable bag member formed by a plurality of sections that are joined in end to end relationship by lap joints, each section of the bag member comprising in transverse cross-section at least two sheets of fabric reinforced rubber joined together at adjacent edge portions and having opposite edges adapted for attachment to rigid structure of an A.C.V. and whereby when the bag member is attached to the rigid structure of the A.C.V. one of said sheets of each said section faces inwardly towards the cushion area at the underside of the A.C.V., said inwardly facing sheets being apertured to provide communication between the interior of the bag member and the cushion area, and a rip stop device bolted with each lap joint between the cushion facing sheets of adjacent sections of the bag member, said rip stop device extending along substantially the length of the lap joint and comprising a flexible sheath member having a flexible core member extending throughout its length and chemically bonded thereto, said sheath member being formed by rubber sheet that is reinforced with fabric providing tensile load path discontinuities in the sheath member at intervals along the length of the core member and at least at regions of the sheath member remote from the core member.

Near to each end of the rip stop device the sheath member may be discontinued over a short length of the core member so that when fitted to the skirt the ends of the rip stop device may be bent through substantially ninety degrees, those portions of the sheath member at the very ends of the rip stop device then being bolted to the skirt material, or to hinge devices by which the skirt material is attached to the rigid structure of the A.C.V., so as to project substantially normally to the lap joint. By this means a rip that has been arrested by the rip stop device is prevented from propagating around the end of the rip stop device and into the next section of the skirt.

Preferably the cushion-facing sheet of a section of a bag member has a continuous length of reinforcing fabric between that edge of the sheet which is attached to the A.C.V. rigid structure and that edge of the sheet which is attached to another sheet of the bag section. With this arrangement both the reinforcing fabric and the rip stop device are capable of carrying the load in the cushion-facing part of the bag and it may be considered to be 'fail-safe'.

The bond between the sheath member and the core member of a rip stop device should be as strong as it is possible to obtain so that when a rip propagating in the skirt material reaches the rip stop device at the lap joint, the load in the skirt material at either side of the rip will be passed into the sheath member and then into the core member without failure of the bond occurring. We have discovered that if the bond between the sheath member and the core member fails over a short length at either side of the rip then because the sheath member is able to distort and slide on the core member over this short length, the rip will propagate around the back of the rip stop device and into and through the next sheet of material.

Preferably at least two bolt holes are provided within the area of each length of reinforcing fabric between the tensile load path discontinuities in the sheath member so that the rip stop device may be bolted to a component part of an A.C.V. flexible skirt assembly at positions intermediate the discontinuities. The tensile load path discontinuities in those regions of the sheath member remote from the core member ensure that tensile loads transferred into the sheath member from the skirt component are not transmitted along these lengths of the sheath member but are passed into the core member, and are transmitted along the core member. By this means the load in the skirt material at the tip of a rip is transferred from the skirt material by the bolted joints into several of the lengths of reinforcing fabric between the tensile load path discontinuities in the sheath member at either side of the rip, and then into the core member because of the bond between the sheath member and the core member. The load is transmitted along the core member and by a reversal of the load path just described is passed back into the material of the skirt component at positions away from the rip.

A rip stop device in accordance with the present invention, and A.C.V. flexible skirt assemblies embodying rip stop devices in accordance with the present invention, will now be described by way of example and with reference to the accompanying drawings, in which.

Figure 1:
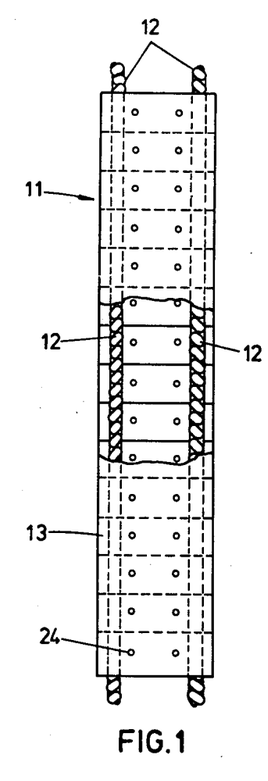
FIG. 1 is a view in plan on a rip stop device in accordance with one embodiment of the invention, and having part of the sheath member cut away to show two core members.
Figure 2:
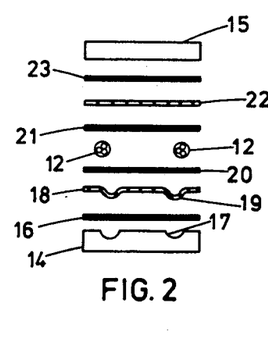
FIG. 2 is an exploded end view of the rip stop device shown in FIG. 1, and illustrates the various component parts making up the rip stop device together with mould plates used in the manufacture of the device.

A rip stop device 11, as shown in FIG. 1, comprises two flexible core members formed by multi-strand nylon ropes 12, and a flexible sheath member 13 extending over a substantial portion of the length of the core members 12. The various component parts of the rip stop device 11 are shown in FIG. 2 positioned between a grooved metal mould plate 14 and a flat metal mould plate 15 used in manufacture of the rip stop device 11. A first sheet of elastomeric material, in this embodiment an uncured neoprene sheet 16, is laid upon the grooved mould plate 14, and the neoprene is pressed down into the grooves 17 of the mould plate 14. Next, discrete lengths of woven nylon fabric 18, pretreated by known means to make the fabric receptive to bonding with neoprene and having performed grooved portions 19 substantially matching the contour of the grooves 17 in the mould plate 14, are laid down in end to end relationship along the length of the neoprene sheet 16. A second uncured neoprene sheet 20 is then laid on top and pressed down into the grooved portions 19 of the nylon fabric 18. The two core members formed by the nylon ropes 12 are next laid down along the grooves that have been formed in the neoprene sheet 20, the nylon ropes 12 having been previously pretreated by known means to make them receptive to bonding with neoprene. A third neoprene sheet 21 is then laid over the nylon ropes 12 and further discrete lengths of woven nylon fabric 22, previously pretreated to make them receptive to bonding with neoprene, are laid down in end to end relationship along the length of the neoprene sheet 21. Finally, a fourth neoprene sheet 23 is laid over the lengths of nylon fabric 22 and the flat mould plate 15 is positioned on top. This assembly is placed in a press and subjected to heat and pressure for a time sufficient to cure the neoprene. During the curing process the neoprene permeates between the interstices of the threads of the lengths of woven nylon fabric 18 and 22, and becomes chemically bonded thereto and to the nylon ropes 12. After removal from the press and from the mould plates, bolt holes 24 are punched in the rip stop device 11, so that two bolt holes are positioned between the nylon ropes 12 within the area of each pair of lengths of woven nylon fabric 18 and 22.

Thus there is formed a rip stop device 11, as shown in FIG. 1, comprising two flexible core members formed by nylon ropes 12 and a flexible sheath member 13 extending over a substantial portion of the length of the core members and being chemically bonded thereto, the sheath member 13 being formed from elastomeric material reinforced by discrete lengths of fabric arranged in end to end relationship so as to provide tensile load path discontinuities in the sheath member at intervals along the length of the core member. In this embodiment the tensile load path discontinuities extend across those parts of the sheath member which are bonded to the core member.

Figure 3:
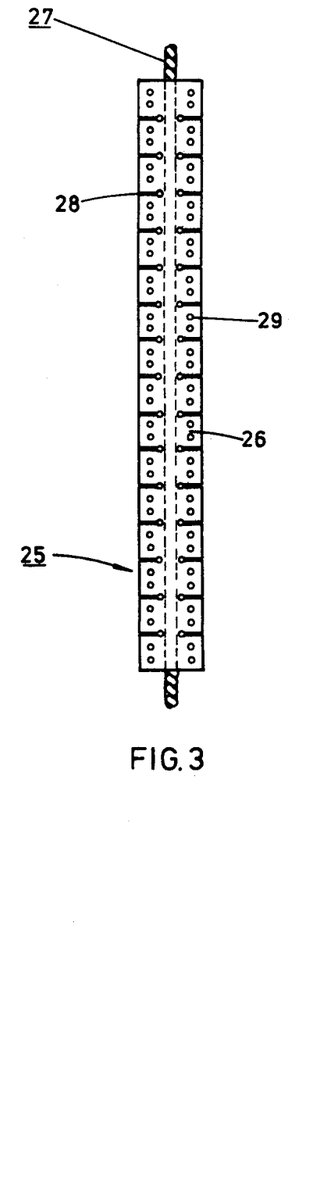
FIG. 3 is a view in plan on a rip stop device in accordance with another embodiment of the invention.

A rip stop device 25 in accordance with another embodiment of the invention and shown in FIG. 3, comprises a flexible sheath member 26 having a flexible core member formed by a multi-strand nylon rope 27 extending throughout its length and chemically bonded thereto. The rip stop device 25 is manufactured from similar material by a similar method to the materials and method hereinbefore described with reference to FIG. 2 for manufacture of the rip stop device 11. However, in this embodiment, for ease of manufacture, the elastomeric sheet material is reinforced with continuous lengths of woven nylon reinforcing fabric, and after curing of the elastomeric material tensile load path discontinuities in the form of keyhole shaped slots 28 are blanked out in those regions of the sheath member 26 at either side of the nylon rope 27. Bolt holes 29 are blanked in the sheath member 26 so as to be within the area of each length of reinforcing fabric between the keyhole shaped slots 28. The tensile load path discontinuities formed by the slots 28 ensure that tensile loads are not transmitted along the length of those regions of the sheath member 26 which are disposed at either side of the core member formed by the nylon rope 27, but are diffused into the nylon rope 27 because of the bond between the sheath member 26 and the nylon rope 27.

Figure 4:
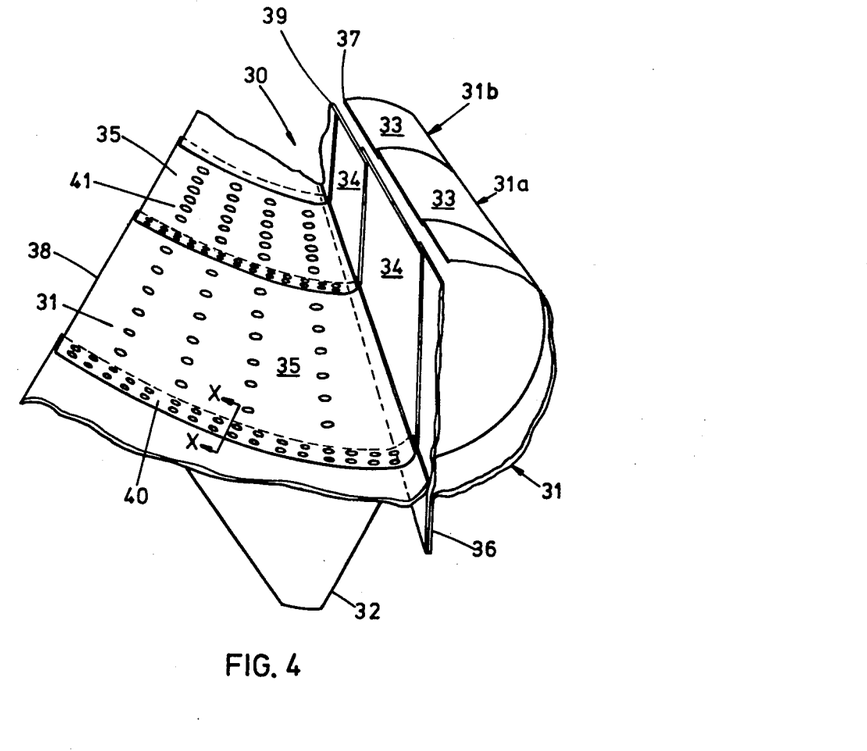
FIG. 4 is a perspective view of a part of a two-stage bag and fingers skirt assembly embodying rip stop devices in accordance with the invention.
Figure 5:
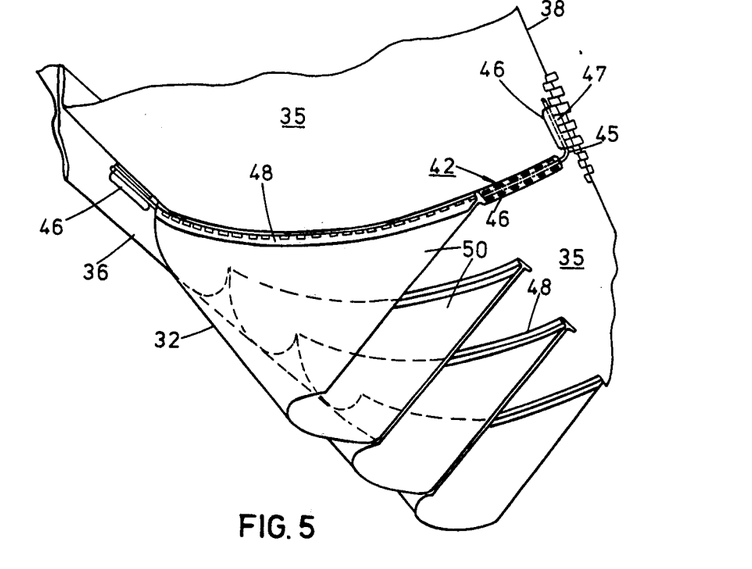
FIG. 5 is a perspective view of the skirt shown in FIG. 4 when viewed from the underside.
Figure 6:
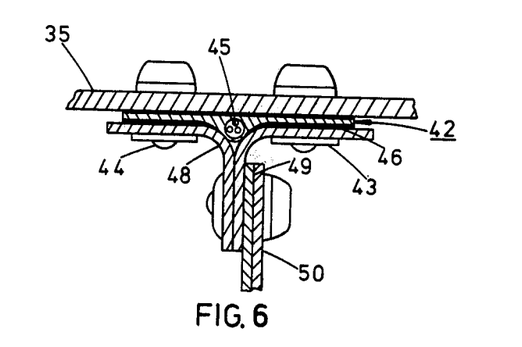
FIG. 6 is a section on line X—X in FIG. 4.

A two-stage flexible skirt assembly 30 suitable for use as at least a part of the cushion sealing means on an A.C.V., and embodying rip stop devices in accordance with the present invention which have single core members, is illustrated in FIGS. 4, 5 and 6. The flexible skirt assembly 30 comprises an upper stage formed as an inflatable bag member 31, and a lower stage formed by a plurality of fingers 32. In transverse cross-section a section of the bag member 31a is formed by three sheets of woven nylon fabric reinforced rubber 33, 34 and 35, respectively, the sheets 33 and 34 being bolted together at adjacent edge portions to form an apron 36 to which the outer parts of the fingers 32 are attached, and an edge portion of the sheet 35 being bolted to the sheet 34 just above the apron 36. The sheets 33 and 35 extend from the apron to have their opposed edges 37 and 38, respectively, adapted for attachment to rigid structure of an A.C.V. (not shown) by hinge fixing devices such as are disclosed in U.S. Pat. No. 3,244,248, and which are partially illustrated in FIG. 5 at the edges 38 of sheet 35. The sheet 34, which acts as a bag stiffening web to reduce skirt oscillation, extends from the apron 36 to have its opposed edge 39 fixed to the vehicle hard structure near to the fixing line of the sheet 33, and by similar hinge fixing devices.

When viewed longitudinally the bag member 31 is made up of a number of sections 31a, 31b, etc., which are joined in end to end relationship by bonded lap joints 40.

The sheet 35 of each section 31a, 31b, is formed by neoprene sheet reinforced by woven nylon fabric that extends in a continuous length from the inner hinge line 38 to the opposed edge that is bolted to the sheet 34. Holes 41 are cut through the neoprene and the woven nylon fabric so as to provide communication between the interior of the bag and the vehicle supporting air cushion, the cushion being fed by air flowing from the bag. It is to be appreciated that the holes 41 shown in FIG. 4 are representative only, the number and diameter of the holes provided in each sheet 35 being such as to give the required pressure drop between the bag inflation air pressure and the cushion air pressure.

At the underside of each lap joint 40, as best seen in FIGS. 5 and 6, a rip stop device 42 is provided. The rip stop device 42 is fastened to the overlapping edges of the sheets 35 forming the lap joint 40 by washers 43 and threadless bolts 44 that are well known in the art of A.C.V. flexible skirts.

The rip stop device 42 comprises a single core member formed by a nylon rope 45 having a diameter such that it will not fail if subjected to the maximum design load of the sheet 35 of a section of the bag member 31, and a sheath member 46 formed by sheets of neoprene that are reinforced with woven nylon fabric. The rip stop device 42 is of similar configuration to the rip stop device 25 hereinbefore described with reference to FIG. 3 of the accompanying drawings and has tensile load path discontinuities provided by slots (not shown) blanked in those regions of the sheath member 46 at either side of the nylon rope 45.

As shown in FIG. 5, near to the inner hinge attachment at edge 38 of sheet and near to the apron 36, the nylon rope 45 is bent through approximately ninety degrees, the sheath member 46 being omitted over this bent portion of the nylon rope 45. That length of the sheath member 46 that extends parallel with the edge 38 of sheet 35 is sandwiched between the sheet 35 and those portions 47 of the hinge device that are fastened to the sheet 35. That portion of the sheath member 46 which extends parallel with the apron 36 is bolted to the apron.

Over part of the length of rip stop device 42 extending inwardly from the apron 36, a T-sectioned web member 48 is fastened with the rip stop device 42 so that the rip stop device 42 is sandwiched between the web member 48 and the sheets 35 forming the lap joint 40. The upper edge portions 49 of two adjacent webs 50 of two adjacent fingers 32 are bolted to the web member 48 using the threadless bolting system that is well known in the art.

The design criteria are such that the woven nylon reinforcing fabric of the sheets 35, and the nylon ropes 45 of the rip stop devices 42, are each capable of carrying the design loads in the cushion-facing part of the bag 31, and this part of the bag member, which in the past has been most prone to failure, is rendered fail-safe.

Should the nylon reinforcing fabric of the sheet 35 fail in fatigue at one of the holes 41, and a rip propagate along the sheet 35, the rip will be arrested when it reaches the lap joints 40. The load at the tip of the rip is then diffused into the nylon rope 45 through several of the lengths of nylon reinforcing fabric between the tensile load path discontinuities in the sheath member 46 at either side of the rip. The load is transmitted along the nylon rope 45 and transferred back into the nylon reinforcing fabric of the sheet 35 at positions away from the rip. Thus the tear is prevented from propagating over a length greater than the length of the sheet 35.

If by chance rips should propagate simultaneously in two adjacent sheets 35, the core rope of the rip stop device at the lap joint between these sheets will hold the torn edges of the sheets together, thereby reducing flapping of these torn edges and the chances of water entering the bag member, both of which are major factors in a section of the skirt being lost, or rendered so ineffective as a cushion retaining barrier that the vehicle cannot be operated on its air cushion.

Whilst in this embodiment rip stop devices 42 are provided only at the lap joints 40 of the sheets 35, in a non-illustrated modification similar rip stop devices are also provided at selected lines of attachment of the finger webs to the sheets 35 between the lap joints 40.

Figures 7, 8, 9:
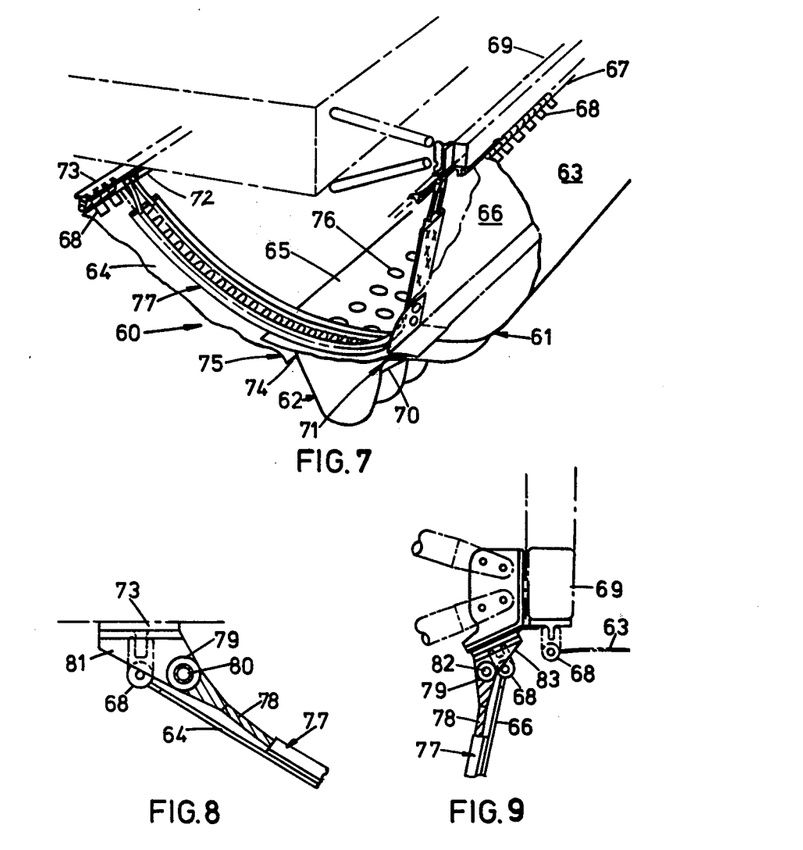
FIG. 7 is a perspective view of part of a two-stage bag and cones skirt assembly embodying rip stop devices in accordance with the invention.
FIG. 8 is a detailed view of attachment of a core member of the rip stop device to rigid structure at a location near to an inner fixing line of the bag illustrated in FIG. 7.
FIG. 9 is a detailed view of attachment of a core member of the rip stop device to rigid structure at a location near to an outer fixing line of the bag illustrated in FIG. 7.

Referring now to FIG. 7, there is shown in part a two-stage flexible skirt assembly 60 particularly suited for use as the cushion sealing means across the rear of an A.C.V. An upper stage of the flexible skirt assembly 60 comprises an inflatable bag member 61 and a lower stage comprises a plurality of flexible hollow cone-shaped members 62. In transverse cross-section a section of the bag member 61 is formed by four sheets of woven nylon reinforced rubber 63, 64, 65 and 66. The sheet 63 is secured along one edge 67 by hinge fixing devices 68 such as are disclosed in U.S. Pat. No. 3,244,248, to rigid structure 69 (shown in chain-dot line) of an A.C.V. (not shown in detail). When the bag member 61 is inflated the sheet 63 extends downwardly in a loop, as shown, to where its opposite edge 70 is turned down to form an apron 71 to which parts of the upper edges of the cone members 62 are attached by bolting. The sheet 64 is secured along one edge 72 by similar hinge fixing devices 68 to rigid structure 73, and has its opposite edge 74 turned down to form an apron 75 to which the cone members 62 are also attached by bolting. The sheet 65 extends between attachment with sheets 64 and attachment with sheet 63 across the top of the cone members 62. Holes 76 are formed in the sheet 65 coincident with the area defined by the top of edge of each cone member 62 so that in operation pressurised air inflating the bag member 61 can pass into the cone members 62. The fourth sheet 66 acts as a bag stiffening web and extends from attachment to the rigid structure 69 downwardly to have its lower edge portion turned outwardly and attached to the sheets 65 and 63, the sheet 65 being sandwiched between the sheets 66 and 63.

When viewed longitudinally the bag member 61 is made up of a plurality of such sections joined in end to end relationship by lap joints.

A rip stop device 77 of construction similar to that hereinbefore described with reference to and shown in FIGS. 1 and 2 of the accompanying drawings, is bolted to the inner face of each lap joint so as to extend, substantially, from the edge of the sheet 64 which is attached to the rigid structure 73 to the edge of the sheet 66 which is attached to the rigid structure 69. In this embodiment the ends of nylon ropes 78 forming core members of the rip stop device 77 are turned back on themselves around fixing thimbles 79 and spliced. At that end of the rip stop device 77 which is near to the rigid structure 73 the thimbles 79 are attached by bolts 80 to brackets 81 mounted on the rigid structure 73, as shown in detail in FIG. 8. At the opposite end of the rip stop device 77, the ends of the nylon ropes 78 are again turned back around thimbles 79 and the thimbles are attached by bolts 82 to brackets 83 mounted on the rigid structure 69, as shown in detail in FIG. 9.

In the event of a rip propagating in any of the sheets 64, 65 or 66 of the bag member 61, then the rip will be arrested when it reaches the rip stop device 77. The load in the reinforcing material of the sheet, at the tip of the rip, will be transferred through the bolts by which the rip stop device is bolted to the sheet, into several of the lengths of sheath member reinforcing fabric at either side of the rip. Because of the bond between the sheath member and the nylon rope, the load in each length of sheath member reinforcing fabric will be diffused into the rope, carried along the rope, and transferred back into the reinforcing material of the sheet, by a reversal of the load path just described, at locations away from the rip. In the extreme case where rips propagate in all of the adjacent sheets 64 or 65 making up the bag member across the full extent of the rear end of an A.C.V., then the rip stops will preserve the integrity of the bag member, the loads in the nylon ropes being passed back into the rigid structures 69 and 73, thus preventing the rear skirt from coming adrift which, due to the massive loss of cushion air, would render the A.C.V. unoperational on its air cushion.

What is claimed is:

1. A rip stop device comprising a flexible sheath member formed from fabric reinforced elastomeric material, a flexible core member extending throughout the length of said sheath member and chemically bonded thereto, said sheath member including tensile load path discontinuities in portions of the reinforcing fabric of said sheath member which extend in opposed lateral directions with respect to said core member at intervals along the length of said core member in regions of said sheath member remote from said core member so that local tensile loads on said sheath member are passed into and transmitted along said core member.

2. A rip stop device as claimed in claim 1, wherein the tensile load path discontinuities extend across those parts of the sheath member which are bonded to the core member.

3. A rip stop device as claimed in claim 2, wherein the tensile load path discontinuities are provided by discrete lengths of reinforcing fabric arranged in end to end relationship throughout the length of the sheath member.

4. A rip stop device as claimed in claim 1, wherein said sheath member is manufactured with a continuous length of reinforcing fabric and the tensile load path discontinuities are provided by blanking out discontinuities in regions of said sheath member remote from said core member.

5. A rip stop device as claimed in claim 1, wherein the lengths of sheath member reinforcing fabric comprise woven nylon cloth.

6. A rip stop device as claimed in claim 1, wherein the elastomeric material of said flexible sheath member comprises neoprene.

7. A rip stop device as claimed in claim 1, wherein said flexible core member comprises a nylon rope.

8. A rip stop device as claimed in claim 1, wherein one or more additional core members extend throughout said sheath member and are spaced from each other across the width of said sheath member.

9. A rip stop device as claimed in claim 1, wherein bolt holes are provided in said sheath member so as to be within the area of each length of reinforcing fabric between said tensile load path discontinuities.

10. A rip stop device according to any one of the preceding claims when fitted to an A.C.V. flexible skirt assembly.

11. An A.C.V. flexible skirt assembly having attached thereto at least one rip stop device comprising a flexible sheath member formed from fabric reinforced elastomeric material, a flexible core member extending throughout the length of said sheath member and chemically bonded thereto, said sheath member including tensile load path discontinuities in portions of the reinforcing fabric of said sheath member which extend in opposed lateral directions with respect to said core member at intervals along the length of said core member in regions of said sheath member remote from said core member so that local tensile loads on said sheath member are passed into and transmitted along said core member.

12. An A.C.V. flexible skirt assembly as claimed in claim 11 wherein said skirt assembly is of two-stage configuration having an upper stage comprising an inflatable bag member formed by sheets of fabric reinforced elastomeric material joined in end to end relationship by lap joints and having their other two edges adapted for attachment to spaced fixing lines on rigid structure of an A.C.V., and a rip stop device attached to the bag member at each said lap joint between longitudinal sections of the bag member.

13. An A.C.V. flexible skirt assembly as claimed in claim 12, wherein each longitudinal section of said bag member comprises in transverse cross-section at least two sheets of fabric reinforced elastomeric material joined at adjacent edge portions and having their opposite edge portions adapted for attachment to rigid structure of an A.C.V., so that one of said at least two sheets faces inwardly towards a cushion area at the underside of the rigid structure of the A.C.V., said rip stop devices being attached along the cushion-facing sides of the lap joints between said cushion-facing sheets.

14. An A.C.V. flexible skirt assembly as claimed in claim 13, wherein a lower stage of said skirt assembly comprises a plurality of fingers, upper edges of two web portions of each finger being secured to web members attached to said cushion-facing sheet of said bag on the cushion-facing side thereof, and a rip stop device positioned between each said web member and said cushion-facing sheet.

15. An A.C.V. flexible skirt assembly as claimed in claim 14, wherein said rip stop device comprises a single core member formed by a nylon rope.

16. An A.C.V. flexible skirt assembly as claimed in claim 15, wherein the end portions of said rip stop device are arranged to extend substantially normal to the major sheath of the rip stop.

17. An A.C.V. flexible skirt assemnly as claimed in claim 12, wherein each longitudinal section of said bag member comprises in transverse cross-section three sheets of fabric reinforced elastomeric material each having an edge portion adapted for attachment to rigid structure of an A.C.V., whereby one of said sheets faces inwardly towards a cushion area at the underside of the rigid structure of the A.C.V., said rip stop devices being positioned inside of the bag member and being attached to both the lap joints between the cushion-facing sheets and the lap joints between the centre one of said three sheets.

18. An A.C.V. flexible skirt assembly as claimed in claim 17, wherein each said rip stop device comprises two core members formed by nylon ropes having ends extending beyond the ends of the sheath member, said extending ends of said nylon ropes being adapted for attachment back to rigid structure of an A.C.V.

* * * * *